(No Model.)
G. E. SPARE.
JUMP SEAT CARRIAGE.
No. 435,716. Patented Sept. 2, 1890.
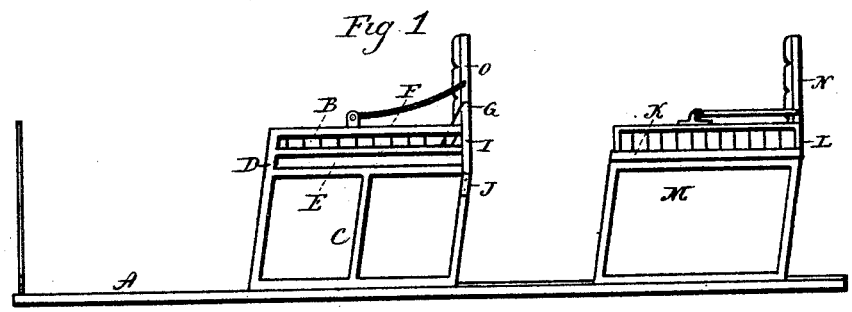
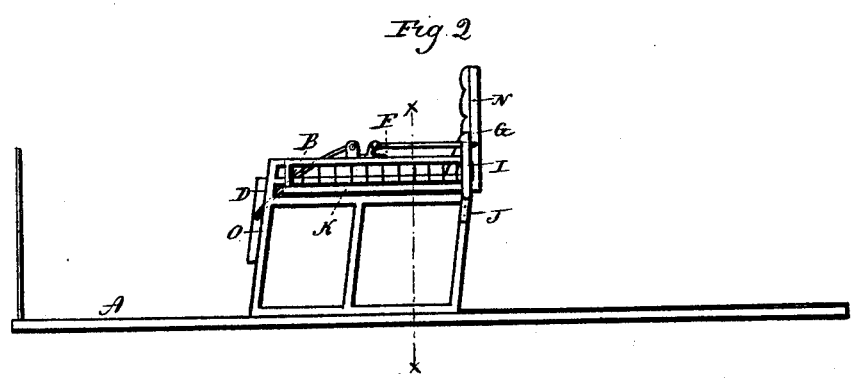
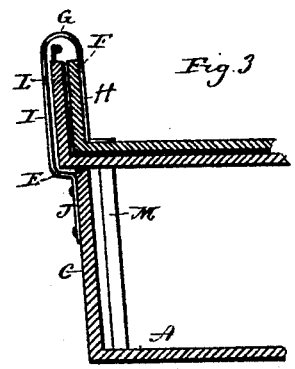
Witnesses
J. H. Shumway
Lillian D. Kelsey
George E. Spare
Inventor
By Atty.
Earle Seymour

UNITED STATES PATENT OFFICE.

GEORGE E. SPARE, OF NEW HAVEN, CONNECTICUT.

JUMP-SEAT CARRIAGE.

SPECIFICATION forming part of Letters Patent No. 435,716, dated September 2, 1890.

Application filed May 5, 1890. Serial No. 350,729. (No model.)

*To all whom it may concern:*

Be it known that I, GEORGE E. SPARE, of New Haven, in the county of New Haven and State of Connecticut, have invented a new Improvement in Jump-Seat Carriages; and I do hereby declare the following, when taken in connection with accompanying drawings, and the letters of reference marked thereon, to be a full, clear, and exact description of the same, and which said drawings constitute part of this specification, and represent, in—

Figure 1, a side view of a two-seated carriage embodying the invention; Fig. 2, the same as Fig. 1, with the rear seat moved forward, as for a single-seat carriage; Fig. 3, a vertical section on line $x\,x$ of Fig. 2, looking rearward.

This invention relates to an improvement in that class of carriages which are provided with two seats, and in which the forward seat is in a stationary position, while the rear seat is adapted to be moved forward into a position corresponding with the forward seat, so as to make the carriage substantially a one-seat carriage or moved rearward into position as a second or rear seat, and commonly called "jump-seat carriages," in contradistinction to a carriage in which the two seats are in stationary positions, and particularly to that class in which the rear seat is adapted to slide on guides backward and forward from the single-seat to the double-seat position, the rear seat passing under the forward seat, the rear seat being of greater length than the forward seat, and so that in the forward position the forward seat will stand within the rear seat.

The object of my invention is a construction which will permit the jump-seat to be made of full length and yet readily brought into the contracted or forward position; and it consists in the construction, as hereinafter described, and particularly recited in the claim.

In the illustration of my invention I show it as applied to a buckboard-wagon, which is sufficient for the illustration of the invention, and to enable others skilled in the art to apply it to other constructions of carriages.

A represents the body, which is of the usual construction; B, the seat-board of the forward seat. The standards or supports C, for this seat, as here represented, are of a panel character, as usual in buckboard-wagons of such construction, and forming a box beneath the forward seat B.

Under the best construction of carrying out my invention the seat-board B is supported at the front upon the standards, as at D, but so as to leave a longitudinal slot E between the under side of the seat-board and the uprights, as seen in Fig. 1, and also as seen in Fig. 3. The seat B is provided with the usual arms F at its ends. To support the seat at the rear and yet leave the slot D open at the rear, a bracket G is applied at each end of the seat, this bracket being of inverted-U shape, one leg H extending down upon the inside of the arm-piece F of the seat, as seen in Fig. 3. The other leg I extending downward, is turned inward and secured against the standard C below the slot, as at J, Fig. 3, thus supporting the seat at the rear directly from the standard, but so as to leave the slot E open from front to rear. The rear seat-board K corresponds in thickness substantially to the width of the slot E, and is of a length so much greater than the seat B that the arm-pieces L of the rear seat K may stand in a plane outside the arm-pieces F of the forward seat, as seen in Fig. 3. The rear seat is supported upon end standards M, but in a plane corresponding to the plane of the slots E below the forward seat, these standards being of panel shape, as usual, but set inside the end of the seat, so that when moved forward they may pass inside the standard C of the forward seat, and as seen in Fig. 3, and substantially as in jump-seats in which the rear seat is moved bodily into the box formed by the forward seat and its end supports. It will be observed that the rear seat is thus made longer than the forward seat, the rear seat overhanging its supports M at each end. The rear seat is arranged on guides so as to slide backward and forward, as usual in this class of carriages, and substantially as in United States Patent No. 422,649, granted to me March 4, 1890.

Supposing the rear seat to stand in the open position, as seen in Fig. 1, and it is desirable to bring it into the forward or single-seat position, as seen in Fig. 2, it is simply moved forward on its guides, the standards M passing inside the standards C, the seat K passing into the slot E and the arm-pieces L outside the arm-pieces F of the forward seat, the bracket G permitting the seat K and its arm-pieces L to thus be moved forward, and when it is desired to reconvert the carriage into two seats, the rear seat is simply drawn backward into the position seen in Fig. 1.

The rear seat may be provided with a back N and the forward seat with a hinged back O, that back O being hinged to the arm-pieces of the forward seat, as shown, so that when the carriage is to be converted into a single seat, the back of the forward seat is turned forward and downward, bringing the back in front of and below the forward seat, as seen in Fig. 2. This arrangement of the swinging back so as to turn down forward of the seat is a well-known device in this class of carriages. Under this construction I am enabled to make the rear seat of somewhat greater length than that of the forward seat instead of very considerably contracted, as in the usual construction, and the conversion of the carriage from a single to a two seat or from two to single seat is of the simplest possible character.

I claim—

In a two-seated carriage the rear seat of which is adapted to slide backward and forward while the forward seat is substantially stationary, the forward seat supported upon standards at its forward edge, the standards each constructed with a longitudinal slot directly below the seat, the said slots open at the rear, with an inverted-U-shaped bracket one leg of which is attached to the seat near its rear edge, the other leg of said bracket extending down outside and secured to the standard below said slots, the rear seat in a plane corresponding to the plane of said slots with its arm-pieces in a plane outside the plane of the arm-pieces of the forward seat and so that as the rear seat slides forward and backward it will pass into or out of said slots, and the arm-pieces of the rear seat will pass within the said brackets and outside the arm-pieces of the forward seat, substantially as described.

GEORGE E. SPARE.

Witnesses:
   JOHN E. EARLE,
   FRED C. EARLE.